United States Patent
Harper et al.

(10) Patent No.: US 7,526,438 B1
(45) Date of Patent: Apr. 28, 2009

(54) LOCALIZING CLIENT PURCHASING OF CONSUMABLES FOR HARDCODY OUTPUT ENGINE AND METHOD

(75) Inventors: Mark A. Harper, Middleton, ID (US); Robert E. Haines, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2035 days.

(21) Appl. No.: 09/665,349

(22) Filed: Sep. 18, 2000

(51) Int. Cl.
*G06Q 30/00* (2006.01)

(52) U.S. Cl. .............................. 705/26; 705/27; 399/8; 399/9; 399/23; 399/24

(58) Field of Classification Search .................. 705/26, 705/27; 399/11, 21, 23, 18; 358/1.15
See application file for complete search history.

(56) References Cited

U.S. PATENT DOCUMENTS

| | | | | |
|---|---|---|---|---|
| 5,305,199 | A * | 4/1994 | LoBiondo et al. | 705/28 |
| 5,517,617 | A * | 5/1996 | Sathaye et al. | 709/222 |
| 5,657,390 | A | 8/1997 | Elgamal et al. | 713/151 |
| 5,805,446 | A * | 9/1998 | Hatakeyama et al. | 700/28 |
| 5,884,073 | A * | 3/1999 | Dent | 713/2 |
| 6,012,098 | A | 1/2000 | Bayeh et al. | 709/246 |
| 6,016,409 | A * | 1/2000 | Beard et al. | 399/33 |
| 6,021,429 | A * | 2/2000 | Danknick | 709/208 |
| 6,023,593 | A * | 2/2000 | Tomidokoro | 399/8 |
| 6,041,360 | A * | 3/2000 | Himmel et al. | 709/245 |
| 6,081,900 | A | 6/2000 | Subramaniam et al. | 713/201 |
| 6,108,099 | A * | 8/2000 | Ohtani | 358/1.15 |
| 6,170,007 | B1 * | 1/2001 | Venkatraman et al. | 709/218 |
| 6,233,409 | B1 * | 5/2001 | Haines et al. | 399/10 |
| 6,247,044 | B1 * | 6/2001 | Gosling et al. | 709/203 |
| 6,272,472 | B1 * | 8/2001 | Danneels et al. | 705/27 |
| 6,333,790 | B1 * | 12/2001 | Kageyama | 358/1.15 |
| 6,351,621 | B1 * | 2/2002 | Richards et al. | 399/111 |
| 6,405,178 | B1 * | 6/2002 | Manchala et al. | 705/29 |
| 6,430,711 | B1 * | 8/2002 | Sekizawa | 714/47 |
| 6,625,581 | B1 * | 9/2003 | Perkowski | 705/27 |

FOREIGN PATENT DOCUMENTS

WO    WO 97/18636    *   5/1997

OTHER PUBLICATIONS

Newton's Telecom Dictionary, Newton, Harry; 1998.*
"Xerox: Xerox fortifies digital office leadersip with five new document centre copier/printers, office software suite; No one addresses the needs ofhte networked office better than Xerox", M2 Presswire, Jun. 20, 2000, p. 1.*

* cited by examiner

*Primary Examiner*—F. Zeender
*Assistant Examiner*—M. Thein

(57) ABSTRACT

A method of programming a memory unit in a hard copy output engine includes determining a geographical area or economic region within which the hard copy output engine is to be deployed, determining an electronic address for a consumables supplier appropriate to the geographical area and programming the electronic address into the memory.

15 Claims, 3 Drawing Sheets

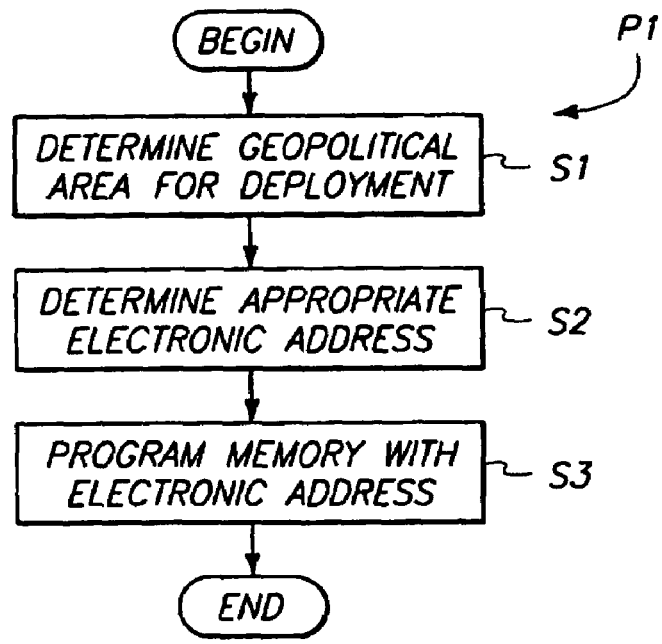
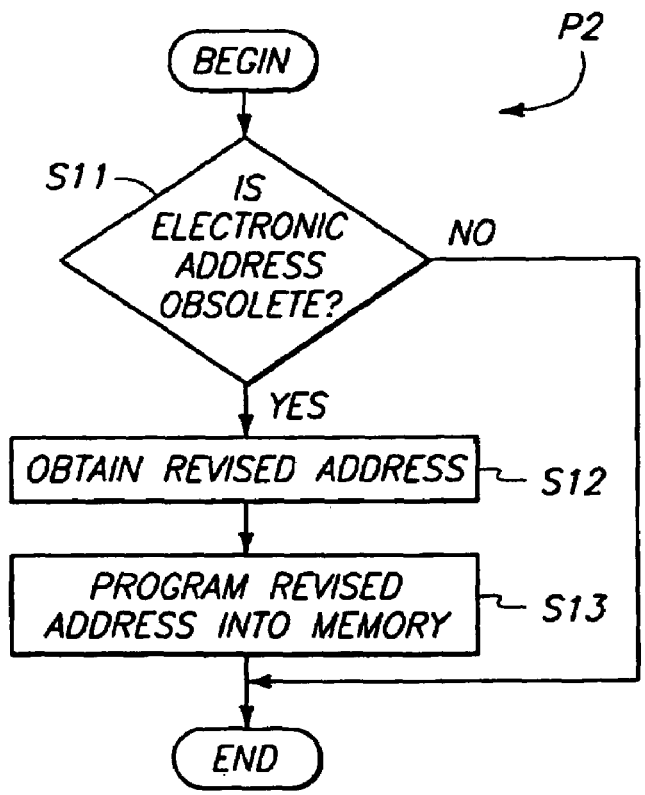

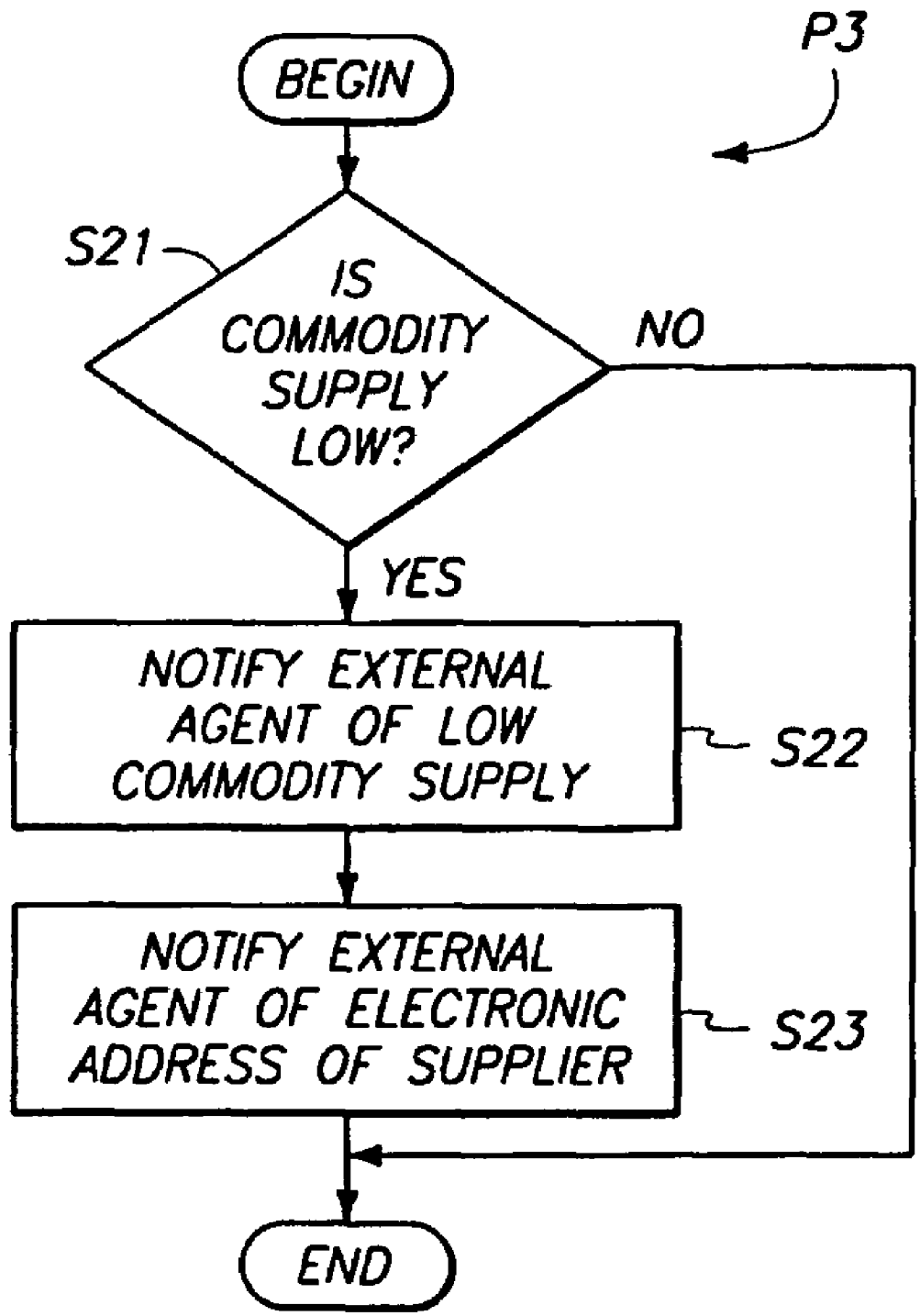

LOCALIZING CLIENT PURCHASING OF CONSUMABLES FOR HARDCODY OUTPUT ENGINE AND METHOD

FIELD OF THE INVENTION

The invention relates to printers and other hard copy output engines. More particularly, the invention relates to providing an electronic address of a supplier of consumables for a hard copy output engine from that hard copy output engine.

BACKGROUND OF THE INVENTION

As computer systems and data communications systems have developed, the number and variety of hard copy output engines employed in a typical office or factory setting has grown. Examples include photo copiers, facsimile machines, printers and devices including more than one of these capabilities. In turn, this has led to a need to be able to order greater number of consumable supplies, some of which are specific to specific types of hard copy output engines.

As need for these types of hard copy output engines has grown, a number of different manufacturers have developed different hard copy output engines providing different operational characteristics and capabilities. While some consumables associated with these devices are common to most or all such devices (e.g., standardized paper sizes), other consumables, such as toners and toner supply cartridges and fusers, ink reservoirs, rollers and transfer belts, among others, tend to be unique to a specific manufacturer. Additionally, different hard copy output engines may have different paper capacities, capabilities for accepting more or fewer paper sizes and different toner or other pigment supply requirements and capacities.

It is generally helpful to have a mechanism for keeping track of usage of consumables in keeping computer systems functional. For example, it is extremely helpful to ensure that adequate supplies of replacement paper and toner or ink are available when needed.

Coordination of orders for supplies can be very helpful to avoid over- or under-stocking of these consumables, while still achieving the benefits of economies of scale by pooling orders to service multiple hard copy output engines, especially those using at least some of the same consumables. However, in many business settings, the sheer number of diverse hard copy output engines being used in different aspects or divisions of the business may lead to confusion in maintaining adequate supplies of these consumables.

What is needed is a way to facilitate provision of data providing a communications link to suppliers of consumables, as well as data describing consumable status, for a network including one or more hard copy output engines.

SUMMARY OF THE INVENTION

In accordance with an aspect of the present invention, a method of programming a memory unit in a hard copy output engine includes determining a geographical area or economic region within which the hard copy output engine is to be deployed, determining an electronic address for a consumables supplier appropriate to the geographical area and programming the electronic address into the memory.

In accordance with another aspect of the present invention, a method of obtaining consumable supplies for a hard copy output engine includes determining that an amount of a consumable for the hard copy output engine is less than a threshold amount, extracting an electronic address for a vendor of the consumable from a memory included in the hard copy output engine and initiating communication with the supplier using the electronic address.

In accordance with yet another aspect of the present invention, a computer implemented control system for a hard copy output engine includes a memory configured to store data representing an electronic address for a supplier of consumables for the hard copy output engine and also includes processing circuitry. The processing circuitry is configured to determine that an amount of a consumable for the hard copy output engine is less than a threshold amount, to extract the electronic address the memory included in the hard copy output engine and to initiate communication with the supplier using the electronic address.

Other features and advantages of the invention will become apparent to those of ordinary skill in the art upon review of the following detailed description, claims and drawings.

DESCRIPTION OF THE DRAWINGS

FIG. 2 is a simplified flowchart illustrating a process, in accordance with an embodiment of the present invention.

FIG. 3 is a simplified flowchart illustrating a process, in accordance with an embodiment of the present invention.

FIG. 4 is a simplified flowchart illustrating a process, in accordance with an embodiment of the present invention.

DETAILED DESCRIPTION OF THE INVENTION

Figure 1:
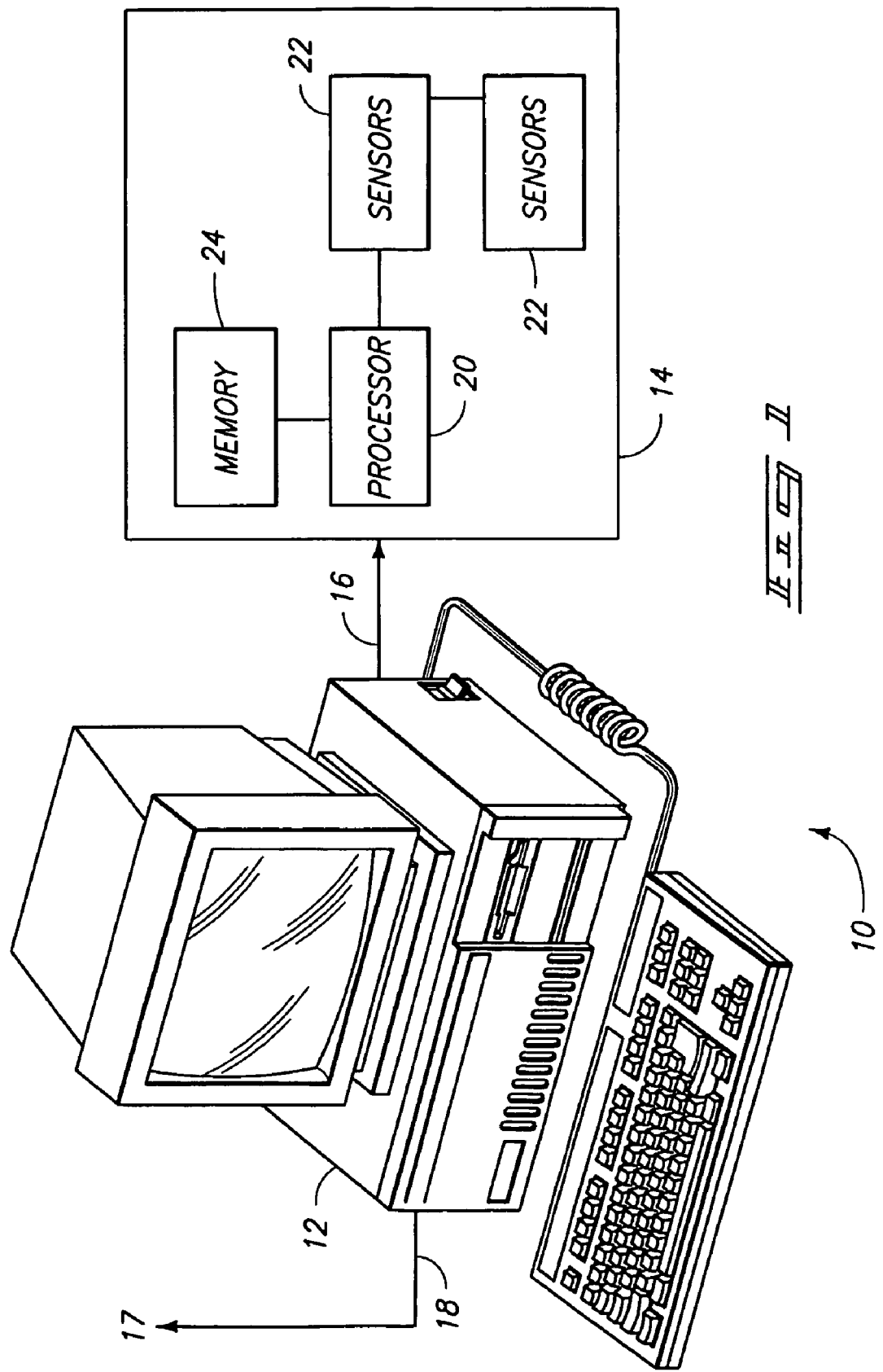
FIG. 1 is a simplified block diagram of a computer network including a computer and a hard copy output engine, in accordance with an embodiment of the present invention.

FIG. 1 is a simplified block diagram of a computer network 10 including a computer 12 and a hard copy output engine 14, in accordance with an embodiment of the present invention. The computer 12 is coupled to the hard copy output engine 14 via a bus 16 allowing either the computer 12 or the hard copy output engine 14 to initiate data communications with the other. In one embodiment, the hard copy output engine 14 is a device such as a printer, copier, mopier, facsimile machine, or a multifunction device capable of providing two or more such functions. In one embodiment, the system 10 is coupled to an external interconnection 17 via a data path 18. In one embodiment, the data path 18 includes an intranet. In one embodiment, the data path 18 includes a local area network (LAN) or wide area network (WAN). In one embodiment, the data path 18 includes access to the Internet. In one embodiment, the computer 12 and the hard copy output engine 14 are capable of exchanging data via a protocol compatible with presence of other computers 12 or hard copy output engines 14 on the bus 16. In one embodiment, the computer 12 and the hard copy output engine 14 employ an object-oriented request-reply protocol supporting asynchronous printer query, control and monitor capabilities, and that is capable of documenting the requests, replies and data types supported by the protocol.

In one embodiment, the data path 18 provides common gateway interface (CGI) data communication capability. In one embodiment, the data path 18 includes an email capability (e.g., simple mail transfer protocol or SMTP) for facilitating data communication. In one embodiment, the data path 18 includes a secure data path using HTTP (hyper text transfer protocol) with SSL (secure sockets layer), as is described in more detail in U.S. Pat. No. 5,657,390, entitled "Secure Socket Layer Application Program Apparatus And Method", issued to Elgamal et al. and U.S. Pat. No. 6,081,900, entitled "Secure Intranet Access" issued to Subramanian et al., which patents are hereby incorporated herein by reference for their teachings.

The hard copy output engine 14 includes a controller 20, such as a conventional microprocessor or microcontroller. The hard copy output engine 14 also includes one or more sensors 22 coupled to the controller 20 and a memory 24 in data communication with the controller 20. In one embodiment, the memory comprises a non-volatile electrically alterable read only memory (EAROM). In one embodiment, the non-volatile memory 24 includes an electrically programmable read only memory (EPROM). In one embodiment, the non-volatile memory 24 includes a write-once, read-many memory (WORM). In one embodiment, the non-volatile memory 24 includes magnetic, magneto-optic or optical storage media, such as conventional disc storage or floppy disc data storage units, or CD-ROMs or the like. The non-volatile memory unit 24 is capable of being externally programmed with data and then storing the data for extended periods of time during which the hard copy output engine 14 may not have access to an external source of electrical energy (.e.g, during shipment from a manufacturer or distributor of hard copy output engines 14 to an end user or destination geographical area).

The sensors 22 are coupled to consumables associated with the hard copy output engine 14. In one embodiment, when the sensors 22 report that a quantity of a consumable (e.g., paper, toner or ink) associated with the hard copy output engine 14 has decreased to below a predetermined threshold amount, or that malfunction of a dispenser of a consumable exists, the controller 20 initiates a data communication ultimately intended for transmission via the data path 18, as is described below in more detail with reference to FIGS. 3 and 4, using data programmed into the hard copy output engine 14, as is described below in more detail with reference to FIG. 2.

FIG. 2 is a simplified flowchart illustrating a process P1, in accordance with an embodiment of the present invention. The process P1 begins with a step S1.

In the step S1, a geographical area or economic region to which the hard copy output engine 14 is to be deployed is determined. The step S1 may be carried out by an original equipment manufacturer, a reseller of hard copy output engines 14 or a purchaser or user of hard copy output engines 14.

In a step S2, an appropriate electronic address for a supplier of consumables for the hard copy output engine 14 is determined for the destination geographical area determined in the step S1. In one embodiment, the electronic address is a URL (universal resource locator) enabling electronic access via the Internet to a supplier or vendor of consumables for the specific hard copy output engine 14 that is to be deployed.

In a step S3, the non-volatile memory 24 in the hard copy output engine is programmed with the electronic address that was determined in the step S2. In one embodiment, other data types may also be programmed into the non-volatile memory 24. For example, a reseller of consumables may have unique part numbers that are programmed into the non-volatile memory 24. Alternatively, some users, such as volume users, of hard copy output engines 14 may specify options (e.g., black vs. color printing, type of ink etc.) and thus pre-determine which types of consumables are to be ordered from a particular set of deployment sites for hard copy output engines 14. Once the non-volatile memory 24 has been programmed, the process P1 ends and other acts involved in preparing the hard copy output engine 14 for deployment, such as functional testing and packaging for shipment, may take place.

FIG. 3 is a simplified flowchart illustrating a process P2, in accordance with an embodiment of the present invention. The process P2 begins by determining, in a query task S11, if the electronic address stored in a nonvolatile memory 24 is obsolete. In one embodiment, the query task S11 is carried out in response to the system 10 of FIG. 1 using the stored electronic address to initiate communication with a web page for a vendor or supplier whose address had been stored in the nonvolatile memory 24 previously (e.g., step S3 of process P1).

The vendor or supplier may have determined that a new address will be required and may make that information available via the old address for a period of time. Alternatively, a vendor or supplier, or an original equipment manufacturer, may notify previous clients via an alternative electronic communication path such as email. Other ways of providing new or revised addresses are possible, e.g., the user of the hard copy output engine may be involved in a billing dispute with the previous supplier, or it may be known that the previous supplier has become insolvent or otherwise unable to function.

When the query task S11 determines that the electronic address stored in the non-volatile memory is obsolete, a revised electronic address is obtained in a step S12.

In a step S13, the revised electronic address is programmed into the non-volatile memory 24. In one embodiment, the revised electronic address replaces the electronic address stored in the step S3 of FIG. 2. In one embodiment, the revised electronic address is stored in the non-volatile memory 24 as an alternative to the electronic address stored in the step S3 of FIG. 2. The process P2 then ends. The process P2 provides flexibility in programming of the non-volatile memory 24 and allows for changes due to revised business conditions, revised user needs (e.g., reduced or increased quality or storage life expectations) and the like.

FIG. 4 is a simplified flowchart illustrating a process P3, in accordance with an embodiment of the present invention. The process P3 begins with a query task S21.

In the query task S21, the controller 20 determines when a supply of a consumable has decreased below a threshold amount. In one embodiment, the sensors 22 of FIG. 1 provide signals to the controller 20 indicative of a remaining amount of consumables. In one embodiment, the sensors 22 provide data indicative of predetermined increments, e.g., 25%, 50% and the like. In one embodiment, the sensors 22 provide data indicative of actual remaining amounts of consumables. In one embodiment, the threshold amount is user-settable and re-adjustable in response to user commands input via the computer 12, for example. In one embodiment, the sensors 22 are also capable of indicating malfunction or failure of a supply of a consumable, such as a failing toner cartridge that is still functioning but that is unlikely to continue to provide functionality for long or that will shortly provide unacceptable hard copy output quality.

When the query task S21 has determined that the supply of the consumable has decreased below the threshold amount, an external agent is notified of this event in a step S22. The electronic address that had been previously stored in the non-volatile memory 24 is also made available in a step S23. An order is initiated for the consumable in a step S24 using the data from the steps S22 and S23. The process P3 then ends.

In one embodiment, signals are sent to a system administrator for order consolidation via the data path 18 of FIG. 1, along with the programmed information describing the electronic address for the vendor or supplier. In one embodiment, signals exchanged between the hard copy output engine 14 and the computer 12 via, for example, the bus 16, allow the computer 12 to initiate communication with the vendor or supplier via a web page using a URL that had been stored in the non-volatile memory 24. In one embodiment, the data from the non-volatile memory 24 invoke a servlet, as described in more detail in U.S. Pat. No. 6,012,098, entitled "Servlet Pairing For Isolation Of The Retrieval And Rendering Of Data" and issued to E. N. Bayeh et al., which patent is hereby incorporated herein by reference.

The protection sought is not to be limited to the disclosed embodiments, which are given by way of example only, but instead is to be limited only by the scope of the appended claims.

What is claimed is:

1. A method of programming a non-volatile memory unit in a hard copy output engine comprising:
   determining a geographical area within which the hard copy output engine is to be deployed;
   determining an electronic address for a consumables supplier appropriate to the geographical area; and
   programming the electronic address into the non-volatile memory.

2. The method of claim 1, wherein determining the electronic address comprises determining a universal resource locator for an original equipment manufacturer.

3. The method of claim 1, wherein determining the electronic address comprises determining a universal resource locator for a reseller of consumable supplies associated with the hard copy output engine.

4. The method of claim 1, further comprising programming the non-volatile memory with product descriptors for consumable supplies associated with the hard copy output engine.

5. The method of claim 1, further comprising:
   determining that the electronic address for the consumables supplier is obsolete;
   determining a revised electronic address for the consumables supplier appropriate to the geographical area; and
   re-programming the non-volatile memory with the revised electronic address to replace the obsolete electronic address.

6. The method of claim 1, wherein the hard copy output engine is chosen from a group consisting of: facsimile machines, photocopiers and printers.

7. The method of claim 1, wherein determining the electronic address comprises determining a universal resource locator for the consumables supplier chosen from a group consisting of: an original equipment manufacturer, a reseller or a supplier of office supplies including hard copy output engine consumables.

8. The method of claim 1, wherein the determinings and the programming are performed prior to deployment of the hard copy output engine in an end user environment.

9. The method of claim 1, wherein the programming comprises programming into the non-volatile memory resident within the hard copy output engine.

10. A method of obtaining consumable supplies for a hard copy output engine comprising:
    determining that an amount of consumable for the hard copy output engine is less than a threshold amount;
    extracting an electronic address for a vendor of the consumable from a non-volatile memory included in the hard copy output engine;
    initiating communication with the vendor using the electronic address; and
    directly communicating with the vendor from the hard copy output engine; wherein extracting the electronic address comprises extracting a universal resource locator for the vendor of consumables appropriate to a geographical area within which the hard copy output engine is deployed.

11. A computer implemented control system for a hard copy output engine, the system comprising:
    non-volatile memory included in the hard copy output engine and configured to store data representing an electronic address for a supplier of consumables for the hard copy output engine; and
    processing circuitry configured to:
      determine that an amount of a consumable for the hard copy output engine is less than a threshold amount;
      extract the electronic address from the non-volatile memory; and
      communicate with the supplier using the electronic address;
    wherein the processor configured to extract the electronic address comprises a processor configured to extract a universal resource locator for the supplier of consumables appropriate to a geographic area within which the hard copy output engine is deployed.

12. A method of obtaining consumable supplies for a hard copy output engine, comprising:
    determining a geographical area within which the hard copy output engine is to be deployed;
    determining an electronic address for a consumables supplier appropriate to the geographical area;
    storing the electronic address in a non-volatile memory of the hard copy output engine; and
    proactively initiating communication with the consumables supplier from the hard copy output engine using the stored electronic address responsive to an amount of a consumable for the hard copy output engine being less than a predetermined threshold.

13. The method of claim 12, wherein the determinings and the storing are performed prior to deployment of the hard copy output engine in an end user environment.

14. The method of claim 12, wherein the proactively initiating communication comprises sending an electronic message from the hard copy output engine to the supplier without user intervention.

15. The method of claim 12, wherein the proactively initiating communication comprises directly communicating with the supplier using the hard copy output engine.

* * * * *

UNITED STATES PATENT AND TRADEMARK OFFICE
CERTIFICATE OF CORRECTION

| | | |
|---|---|---|
| PATENT NO. | : 7,526,438 B1 | Page 1 of 1 |
| APPLICATION NO. | : 09/665349 | |
| DATED | : April 28, 2009 | |
| INVENTOR(S) | : Mark A. Harper et al. | |

It is certified that error appears in the above-identified patent and that said Letters Patent is hereby corrected as shown below:

On the Title Pg, Item (54), in "Title", in column 1, line 2, delete "HARDCODY" and insert -- HARDCOPY --, therefor.

In column 1, line 2, delete "HARDCODY" and insert -- HARDCOPY --, therefor.

Signed and Sealed this

Twenty-fourth Day of August, 2010

David J. Kappos
*Director of the United States Patent and Trademark Office*